United States Patent [19]
Ushiku et al.

[11] 4,210,789
[45] Jul. 1, 1980

[54] IMPACT DETECTING SWITCH

[75] Inventors: Kenichi Ushiku, Tokaimura; Akira Hasegawa, Katsuta, both of Japan

[73] Assignees: Hitachi, Ltd.; Nissan Motor Co., Ltd., both of Japan

[21] Appl. No.: 843,268

[22] Filed: Oct. 18, 1977

[30] Foreign Application Priority Data

Oct. 20, 1976 [JP] Japan .................................. 51/124882

[51] Int. Cl.² .......................................... H01H 35/14
[52] U.S. Cl. ........................... 200/61.45 R; 200/61.53
[58] Field of Search ............... 200/61.45 R, 61.45 M, 200/61.53, 158, DIG. 45, 61.46; 73/503, 514, 517 R

[56] References Cited
U.S. PATENT DOCUMENTS

| 2,798,136 | 7/1957 | Taubox | 200/158 |
| 3,020,367 | 2/1962 | Bariffi | 200/61.53 |
| 3,066,540 | 12/1962 | Severance | 73/490 |
| 3,120,760 | 2/1964 | Waldhauer, Jr. | 73/490 |
| 3,749,863 | 7/1973 | Kaiser | 200/61.45 R |
| 3,832,505 | 8/1974 | Wong | 200/158 |
| 3,867,601 | 2/1975 | Lipschutz | 200/158 |

Primary Examiner—James R. Scott
Attorney, Agent, or Firm—Craig & Antonelli

[57] ABSTRACT

An impact detecting device of the type including a casing; a movable member which is housed in the casing and movable substantially along a straight line relative to the casing, when the device is subjected to an impact; a spring for elastically loading the movable member during its movement in the direction against the direction of the movement of the movable member; and a switch adapted to be closed, when the movable member is moved a given distance against the action of the spring. In this device, there is provided a spiral guide which engages the movable member during its movement so as to rotate the movable member, whereby part of energy to be imparted to the casing and movable member due to impact upon collision is consumed for the rotation of the movable member, so that an extent of movement of the movable member may be shortened.

32 Claims, 15 Drawing Figures

IMPACT DETECTING SWITCH

LIST OF PRIOR ART REFERENCES (37 CFR 1.56 (a))

The following references are cited to show the state of the art:
U.S. Pat. No. 3,066,540, Dec. 4, 1962, Ralph H Severance;
U.S. Pat. No. 3,120,760, Feb. 11, 1964, Charles H Waldhauer, Jr.;
Japanese Patent Publication No. 8,150/68 Mar. 28, 1968 Toshio Furuyama et al;
Japanese Patent Publication No. 12593/66 July 18, 1966 Hiroshi Akita.

BACKGROUND OF THE INVENTION

This invention relates to a device for detecting large impact, such as, resulting from the collision of a vehicle with another body, and more particularly to an impact detecting device equipped with a movable member (mass) and an elastic member.

In general, when a vehicle collides with another body and hence is decelerated, deceleration of the vehicle and deceleration time vary to a large extent depending on the type of body, with which the vehicle collides. For instance, in case a vehicle collides with a concrete wall, the deceleration of the vehicle is extremely high, and the time lapsed for the vehicle to stop is also extremely short. On the other hand, in case a vehicle collides with a guard rail or other vehicle, the resulting deceleration is relatively low, and the time lapsed for the vehicle to stop is relatively long. Since deceleration varies depending on the type of body, with which a vehicle collides, it is not preferable that the collision of a vehicle be detected by resorting to the deceleration alone. In this sense, there has been developed a collision or impact detecting device, in which an integration of a deceleration resulting from the collision of a vehicle is measured, and then when the integration arrives a given value, a signal is developed. The collision detecting device of the type described includes a movable member (or mass) movable substantially along a straight line from an unactuated position to an actuated position, a spring for resisting the movement of the movable member, and a switch actuated by the movable member, whereby when impact is applied thereto, the movable member moves from its unactuated position to its actuated position, thereby actuating the aforesaid switch. Meanwhile, the duration or time to be lapsed from the collision of a vehicle to the stoppage thereof is as short as 3 to 40 milliseconds. For detecting a collision which causes deceleration only of such a short time, it is mandatory that the spring constant of the spring be lowered. It follows from this that the extent of the movement of the movable member is about 100 mm, and hence the size of the detecting device should be increased, with an additional difficulty of attaching the device to a bumper of a vehicle.

SUMMARY OF THE INVENTION

It is accordingly an object of the present invention to provide an impact detecting device which is small in size.

It is another object of the present invention to provide an impact detecting device, in which an extent of the movement of a mass may be shortened, maintaining high accuracy of detection.

It is still another object of the present invention to provide an impact detecting device, which is preferable to mount on a bumper of a vehicle to detect a collision of the vehicle.

According to the present invention, a movable member is rotated by means of a spiral guide means, during its linear movement, thereby increasing an apparent mass of the movable member for shortening the extent of the movement of the movable member, thus attaining the aforesaid objects.

DESCRIPTION OF THE PREFERRED EMBODIMENTS

Figure 1:
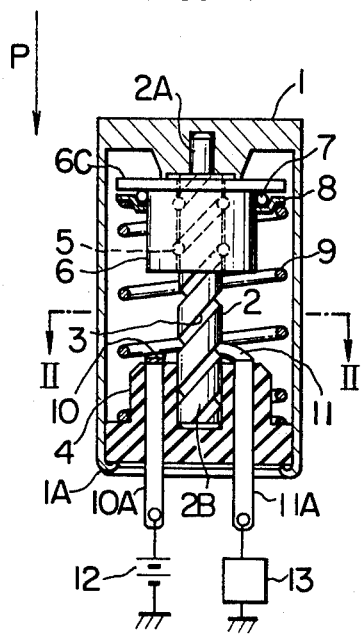
FIG. 1 is a longitudinal cross-sectional view of one embodiment of the invention.

The present invention will now be described in more detail in conjunction with the accompanying drawings which indicate embodiments of the invention. Throughout these embodiments, like parts are designated with like reference numerals and hence duplicated description will be omitted for the like parts.

Figure 3:
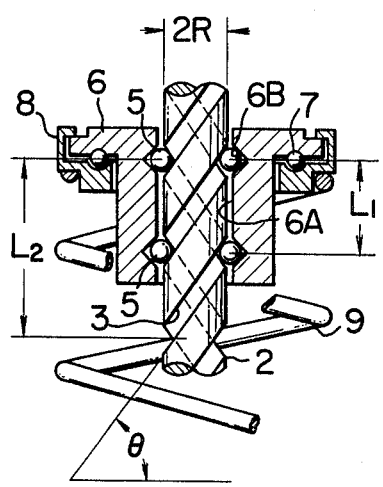
FIG. 3 is an enlarged cross-sectional view of a portion of the embodiment.
Figure 2:
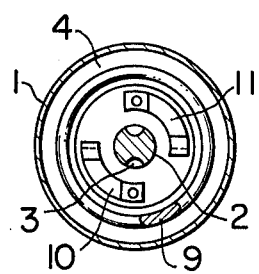
FIG. 2 is a cross-sectional view taken along the line II—II of FIG. 1.

FIGS. 1 to 3 are views showing the first embodiment of the invention. As shown, a casing 1 of a bottomed, cylindrical shape contains a shaft 2 in its center, with one end 2A of the shaft 2 being anchored to the casing 1. Two lines of spiral grooves 3 are provided in the outer periphery of the shaft 2 as spiral guide means. The other end 2B of the shaft 2 is supported by a cover member 4 which is made of an insulating material, and secured to a calked portion 1A at an open end of the casing 1, so that the shaft 2 is supported at the opposite ends thereof in this manner.

A movable member 6 of a hollow cylindrical shape, which is made of an electrically conductive material and has a center hole 6A of a diameter slightly larger than an outer diameter of the shaft 2 is fitted on an outer periphery of the shaft 2. Thus, the movable member 6 is rotatable and movable along the shaft 2 linearly. A pair of recesses 6B are provided in the wall of central hole 6A of the movable member 6 in each of two spaced planes, which are perpendicular to the axis of the center hole 6A. The recesses 6B are located corresponding to the spiral grooves 3 of the shaft 2, with balls 5 being confined between the recesses 6B and the spiral grooves 3. Thus, during the movement of the movable member 6 along the shaft 2, the balls retained in the recesses move along the spiral grooves 3 of the shaft 2 so that the member 6 rotates at a minimized frictional resistance. The number of spiral grooves provided in the outer periphery of shaft 2 should not necessarily be limited to two but may be three or more. In case three spiral grooves are used, then three recesses for retaining balls therein should be provided in a plane perpendicular to the axis of shaft 2.

Provided in abutment with a flange portion 6C of the movable member 6, which is positioned at an end of the member 6, through the medium of a disc seat 8 and balls 7 is one end of a compression coil spring 9 serving as elastic means. The other end of the coil spring 9 abuts the cover member 4. The movable member 6 is elastically loaded so as to be urged against a bottom surface of the casing 1 by means of the coil spring 9.

Provided on the inner surface of the cover member 4 are a pair of contact members 10, 11 which are made of an electrically conductive, resilient member, such as phosphor bronze, and opposed to the movable member 6. Terminals 10A, 11A are connected to the contact members 10, 11 integrally therewith and project from the cover member 4 outwards. Connected to the terminal 10A is a positive pole of a battery 12 whose negative pole is grounded, while the terminal 11A is connected to an end of a load 13 such as igniting means filled in, for instance, an air bag, the other end of the load 13 being grounded. The contact members 10, 11 and movable member 6 constitute a switch.

Description will now be turned to the operation of the impact detecting device according to the present invention.

Assume that the impact detecting device according to the embodiments of the invention is installed on a vehicle, and that the vehicle runs in an arrow direction P. In the event that the vehicle collides with a body at a speed of no less than a given level, deceleration takes place in the direction opposite to an arrow direction P. This condition may be deemed as a condition where the casing 1 stands still, and the movable member 6 alone is subjected to acceleration in the arrow direction P, and hence discussion will be given hereinafter, based on this assumption. The movable member 6 is regarded as moving in the direction P according to the acceleration in the direction P. The movable member 6 is rotatingly moved along the shaft to elastically load a coil spring, i.e., to impact elastic energy to the spring 9. When the movable member 6 is moved to a further extent, then the undersurface of the movable member 6 made of an electrically conductive material contacts the contact members 10, 11, thereby closing the switch consisting of contact members 10, 11 and movable member 6. As a result, an electric current flows from a power source 12 to the load 13 via terminal 10A, contact member 10, movable member 6, contact member 11 and terminal 10B, so that impact may be detected.

An inertial mass of the movable member 6 is given as follows:

$$M + I/(R \cdot \sin \theta)^2 \tag{1}$$

wherein
M: mass of movable member 6
I: moment of inertia of movable member 6
$\theta$: lead angle of spiral groove 3

As can be seen from the above equation, an inertial mass of the movable member 6, when rotating, is increased by $I/(R \cdot \sin\theta)^2$, as compared with an inertial mass which moves only along a straight line, with the result that an extent of the movement of movable member 6 may be shortened accordingly. It follows then that the extent of the movement of movable member 6 may be shortened only be selecting the moment of inertia I of the movable member 6 or the lead angle $\theta$ of the shaft 2, without changing the spring force of the coil spring 9.

In addition, since an apparent inertia of the movable member 6 is considerably great, even if the distance from the movable member 6 in the unactuated position to the contact members 10, 11 is set at 3 to 5 mm, forces other than an impact resulting from collision, for instance, a noise will not cause the movable member to contact the contact members 10, 11 and hence no malfunction takes place. For the same reasons, in case the movable member 6 contacts the contact members 10, 11, a duration of contact between the former and the latter is relatively long, so that a signal may be delivered outside reliably.

The advantages of the impact detecting device according to this embodiment are enumerated as follows:

(i) A size of the impact detecting device may be reduced. For instance, the extent of the movement of the movable member 6 may be reduced to less than 1/10, and a volume of the device may be reduced to less than ⅓, as compared with prior art devices.

(ii) The duration that the contacts are maintained in contact may be extended;

(iii) No malfunction results from a noise.

(iv) There are many factors which affect the freedoms of the device in a design stage, such as for instance, a pitch of the spiral groove 3, a radius R of the shaft 2, and an inertial mass I of the movable member 6, thereby increasing the number of freedoms in a design stage, as compared with prior art devices.

(v) The casing 1 is tightly closed with the cover member 4, thereby preventing ingress of dust into a sliding portion of the movable member 6, thus insuring a consistent performance.

(vi) Since balls 5 are interposed between the movable member 6 and the spiral grooves 3, the movable member may be smoothly moved; and (vii) Since two or three spiral grooves are used, an axial spacing L1 between the balls may be reduced, irrespective of a lead L2 of the spiral grooves, so that a size of the impact detecting device may be reduced.

Meanwhile, the flange portion 6C of movable member 6 is spaced through the medium of balls from the seat 8 in this embodiment. However, such an engagement may be replaced by the medium of a material having lublicity, such as a coating of Teflon (fluorine resin). In addition, a force of the coil spring 9 may be adjusted by means of an adjusting screw. Still furthermore, spiral grooves 3 may be replaced by spiral guides of other configuration than grooves. Yet furthermore, a switch consisting of contact members 10, 11 and movable member 6 may be replaced by an ordinary type microswitch or a lead switch adapted to be actuated due to the movement of the movable member 6 or coil spring 9. Furthermore, the contact members 10, 11 may directly contact each other. However, as in the embodiment, the provision of contacts 10, 11 in a manner as used in this embodiment may reduce a longitudinal dimension of the device.

Figure 4:
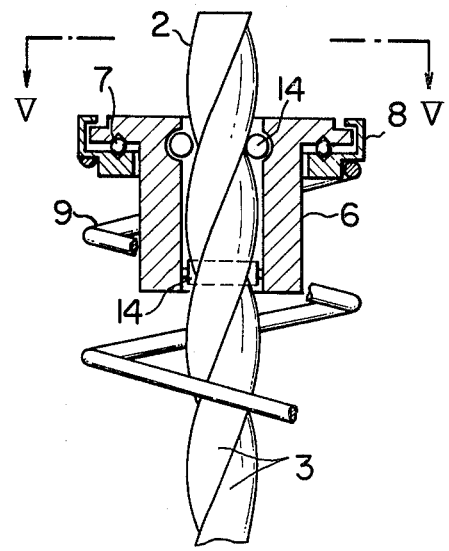
FIG. 4 is an enlarged cross-sectional view of a portion of another embodiment of the invention.
Figure 5:
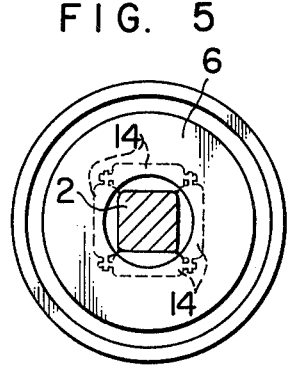
FIG. 5 is a cross-sectional view taken along the line V—V of FIG. 4.

FIGS. 4 and 5 show an essential part of the shaft 2 according to another embodiment of the invention. The shaft 2 having a rectangular cross-sectional shape in this embodiment is twisted so as to form spiral guide surfaces 3 around the peripheral surface of shaft 2. Provided between the spiral guide surfaces 3 and the movable member 6 are four rollers 14 adapted to smoothly guide the movable member 6 along the spiral guide surface 4. The rollers 14 are rotatably supported by the movable member 6. The operation and functions of the rollers are self-explanatory and thus description thereof is omitted herein.

According to this embodiment, the shaft 2 should not be subjected to a machining operation, and thus be high in strength. In other words, a cross sectional area of the shaft 2 may be reduced.

Figure 6:
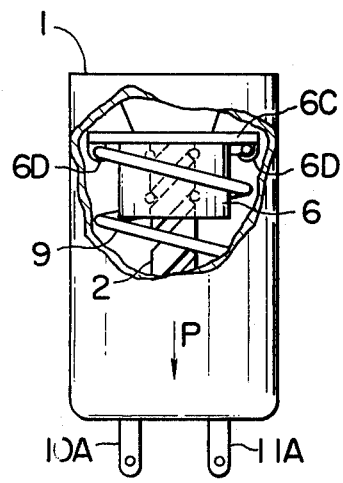
FIG. 6 is a side view, partly broken, of still another embodiment of the invention.

FIG. 6 shows still another embodiment in its front view, part of which is broken. In this embodiment, one end of a compression coil spring 9 serving as an elastic means is secured to a calked pawl 6D provided on an outer peripheral edge of the flange 6C of the movable member 6. In this case, the other end of the coil spring 9 is secured to the casing 1 or cover member 4 of the casing 1. Alternatively, an end face of the coil spring 9 is secured to a recess provided in such a surface of the cover member 4, which contacts the end face of the coil spring 9.

With the aforesaid arrangement, an extent of the movement of movable member 6 may be further reduced, because of a combined action of a torsion-resistance of the coil spring 9, when the movable member 6 is rotated, and a compression resistance of the advancing movement of the coil spring 9. In addition, a friction reducing means is not required between the movable member 6 and the coil spring 9, so the construction of the device may be simplified, with freedom from instable operation due to an unsteady resisting force resulting from a sliding movement of the movable member 6 relative to the coil spring 9, thus achieving a consistent characteristic.

Meanwhile, in this embodiment, a tension coil spring may be used in place of the compression spring 9 as an elastic member. In this case, however, a tension force acts on the movable member 6.

Figure 7:
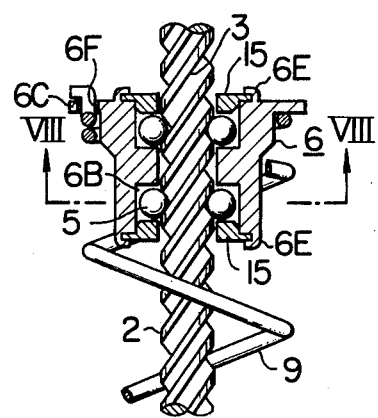
FIG. 7 is an enlarged cross-sectional view showing yet another embodiment of the invention.
Figure 8:
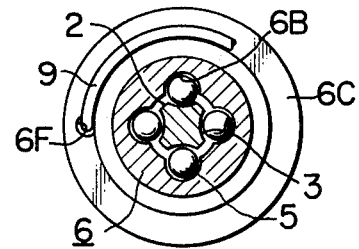
FIG. 8 is a cross-sectional view taken along the line VIII—VIII of FIG. 7.
Figure 9:
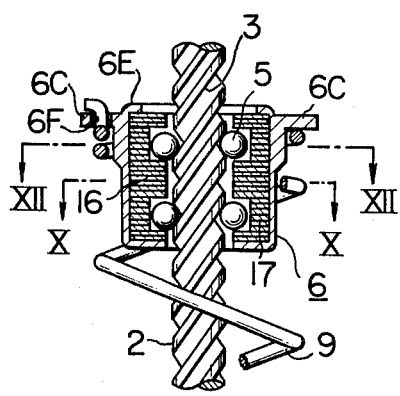
FIG. 9 is an enlarged cross-sectional view of an essential part of a further embodiment of the invention.
Figure 10:
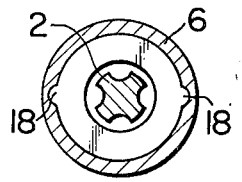
FIG. 10 is a cross-sectional view taken along the line X—X of FIG. 9.
Figure 11:
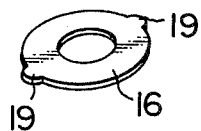
FIG. 11 is a perspective view of one of the retaining members for use in the embodiment of FIG. 9.
Figure 12:
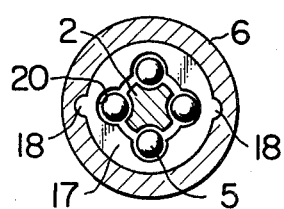
FIG. 12 is a cross-sectional view taken along the line XII—XII of FIG. 9.
Figure 13:
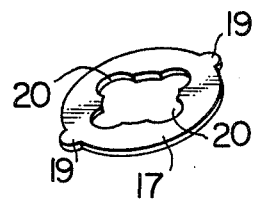
FIG. 13 is a perspective view of the other retaining member for use in the embodiment of FIG. 9.

FIGS. 7 and 8 show a further embodiment of the invention. In this embodiment, four lines of spiral grooves 3 are formed in the outer periphery of shaft 2, while four recesses 6B which may retain balls therein are provided in an inner surface of the movable member 6 in each of two planes which are perpendicular to the axis of the movable member 6 and are spaced a distance from each other in the axial direction of the movable member 6. The recesses 6B are formed through the opposite ends of the movable member according to a milling operation. Balls 5 are retained in the recesses 6B, while retaining members 15 adapted to prevent the balls from coming off the recesses 6B are secured to the movable member by means of calking pawls 6E. Accordingly, the movable member 6 slidingly moves along the spiral grooves 3 provided in the shaft 2 at a small frictional resistance. The top end of the coil spring 9 is inserted in a hole 6F provided in the flange portion 6C of the movable member 6, while the other end of the coil spring 9 is secured to a hole in the cover member 4 (not shown). In this embodiment, both a torsion-resisting force or drag and a compression resisting force of the coil spring 9 act on the movable member.

FIGS. 9 to 13 show a further embodiment of the invention. A difference from the embodiment of FIGS. 7 and 8 is that the movable member 6 contains a number of retaining members 16, 17 formed of a sheet having a desired rigidity according to punching and press-forming techniques. In this respect, the aforesaid retaining members 16, 17 serve to positively retain the balls 5 relative to the movable member 6. More particularly, the retaining members include retaining members 17 each having a center hole of a diameter larger than that of the shaft 2, recessed portions 20, and lug portions 19, and retaining members 16 each having lug portions and a center hole of a diameter larger than that of the shaft 2. These members 16, 17 are stacked in a manner to retain balls 5 in position. The retaining members 16, 17 are rigidly held due to the engagement of recessed portions 18 in the movable member 6 with the lugs 19 of the retaining members 16, 17 as well as by means of calking pawls 6E. The detecting device according to this embodiment is less costly as compared with the others.

Figure 14:
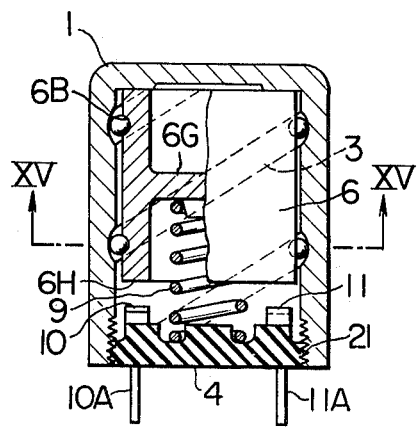
FIG. 14 is a cross-sectional view showing a still further embodiment of the invention.
Figure 15:
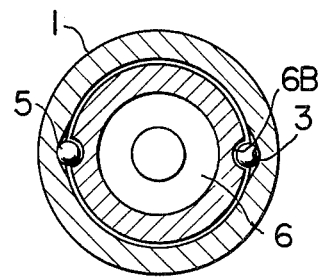
FIG. 15 is a cross-sectional view taken along the line XV—XV of FIG. 14.

FIGS. 14 and 15 show a still further embodiment of the invention. In this embodiment, a shaft is not used, but the outer peripheral surface of the movable member is guided by means of the inner peripheral surface of the casing 1. In other words, spiral grooves 3 serving as guide means are provided in the inner peripheral surface of the casing 1, while two recesses 6B are provided in the outer peripheral surface of the movable member 6 in each of upper and lower positions thereof, with balls being interposed between the grooves 3, and recesses 6B. A cover member 4 having contact members 10, 11 embedded therein is threaded into threaded portion 21 formed on the casing 1. The movable member 6 has a partition wall 6G internally. A compression coil spring 9 serving as an elastic member is interposed between the partition wall 6G and the cover member 4. Accordingly, when the movable member 6 moves against the action of the coil spring 9, an end face 6H of the movable member 6 contacts the contact members 10, 11, thereby closing a switch.

In this case, the movable member 6 may be formed of an electrically conductive material in its entirety, or an electrically conductive plate may be secured to the end face 6H.

In this embodiment as well, the switch is closed due to the rotating movement of the movable member 6 upon collision of a vehicle against other body. However, according to the present invention, the outer peripheral surface of the movable member 6 is guided, so that the movable member may be operated in a stable manner, and the number of parts may be reduced.

Description has been had to the embodiments of the present invention. However, these embodiments should not be construed in a limitative sense, and thus various alternations and modifications may be effected within the scope of the present invention.

Meanwhile, in the aforesaid embodiments, the movable member 6 is moved due to the acceleration resulting from the collision of a vehicle with other body, and the contact pieces 10, 11 are closed. However, part of the embodiments may be modified for the purpose of measuring a variation in speed of a rotational drive source, such as a motor. More specifically, a shaft having spiral grooves serving as guide means is provided in a casing in a rotatable manner, while a disc is secured to a portion of the shaft. In addition, a movable member is supported on the shaft through the medium of balls so that it may rotate and move along the shaft. An elastic means such as a coil spring is interposed between the movable member and the disc secured to the shaft. Still furthermore, a switch is positioned in the close vicinity of the movable member, which switch is opened and closed by means of the movable member when the movable member is moved along the shaft a given distance against the action of the elastic means. An end of the shaft projects from the casing and is connected to a rotational drive source through the medium of a cooperative mechanism such as pulleys, belts and the like. With the aforesaid arrangement, in case the speed of a rotational drive source is changed abruptly, the movable member which has been rotating together with the shaft fails to follow a change in rotation of the shaft, thereby moving along the shaft against the action of an elastic means so as to actuate the switch, thereby detecting a speed change exceeding a given level of the rotational drive source. In this case, when switches are provided on upper and lower portions of the movable member, then a change in speed, when increased or decreased, may be detected.

What is claimed is:

1. An impact detecting device comprising:
   a casing;
   a movable member capable of moving substantially along a straight line relative to said casing;
   means for rotating said movable member during the movement of said movable member substantially along the straight line;
   elastic means interposed between said casing and said movable member for elastically loading said movable member in a direction along said straight line to resist the movement of said movable member;
   a switch means to be closed, when said movable member is moved a given distance relative to said casing against the action of said elastic means,
   wherein said movable member has a center hole extending therethrough in the direction of the movement of said movable member; said means for rotating said movable member comprising guide means which is provided with spiral grooves in the outer peripheral surface thereof and has at least one end thereof secured to said casing and extends through said center hole of said movable member, and interconnecting means engaging said movable member in given positions as well as said spiral grooves, and movable along said spiral grooves.

2. An impact detecting device as set forth in claim 1, wherein said interconnecting means includes recesses provided in the wall of said center hole in said movable member and balls which are retained in said recesses and have at least part thereof projecting from said wall, said balls engaging said spiral grooves.

3. An impact detecting device as set forth in claim 1, wherein said elastic means comprises a coil spring which extends in the direction of the movement of said movable member, one end of said coil spring engaging said movable member in a rotatable manner.

4. An impact detecting device as set forth in claim 1, wherein said casing is tightly closed and said movable member is housed interiorly of said casing.

5. An impact detecting device as set forth in claim 1, wherein said elastic means comprises a coil spring which extends in the direction of the movement of said movable member, one end of said coil spring being secured to said movable member, and the other end thereof being secured to said casing, thereby elastically spirally loading said movable member, which is rotating relative to said casing, in the direction to resist the rotation of said movable member.

6. An impact detecting device as set forth in claim 1, wherein said elastic means comprises a coil spring which extends in the direction of the movement of said movable member, one end of said coil spring being secured to said movable member, the other end of said coil spring being secured to said casing, and said coil spring elastically spirally loading said movable member, which is rotating relative to said casing, in the direction to resist the rotation of said movable member.

7. An impact detecting device as set forth in claim 1, wherein said guide means includes a rod having a plurality of spiral grooves in its outer peripheral surface; said interconnecting means includes at least two sets of a plurality of recesses provided in the wall of said center hole in said movable member, said two sets being positioned in two planes which extend substantially at a right angle to the axis of rotation of said movable member and are spaced a distance from each other in the axial direction, and said interconnecting means including balls which are retained in said recesses and have at least parts thereof projecting from said wall of said center hole to engage with said spiral grooves.

8. An impact detecting device as set forth in claim 7 wherein said elastic means comprises a coil spring which extends in the direction of the movement of said movable member, one end of said coil spring engaging said movable member in a rotatable manner.

9. An impact detecting device as set forth in claim 7, wherein said casing is tightly closed, and said movable member is housed interiorly of said casing.

10. An impact detecting device as set forth in claim 7, wherein said elastic means comprises a coil spring which extends in the direction of the movement of said movable member, one end of said coil spring being secured to said movable member, and the other end thereof being secured to said casing, thereby elastically spirally loading said movable member, which is rotating relative to said casing, in the direction to resist the rotation of said movable member.

11. An impact detecting device as set forth in claim 10, wherein said movable member comprises a hollow cylindrical member and a plurality of stacked sheet members which are contained in said hollow cylindrical member, said recesses being provided in said stacked sheet members.

12. An impact detecting device comprising:
    a casing;
    a movable member capable of moving substantially along a straight line relative to said casing;
    means for rotating said movable member during the movement of said movable member substantially along the straight line;
    elastic means interposed between said casing and said movable member for elastically loading said movable member in a direction along said straight line to resist the movement of said movable member;
    a switch means to be closed, when said movable member is moved a given distance relative to said casing against the action of said elastic means,
    wherein said movable member has a center hole extending through said movable member in the direction of the movement o said movable member; said means for rotating said movable member includes (i) guide means which is of a substantially rectangular cross sectional shape, and has a spiral guide surface in the peripheral outer surface thereof, one end of said guide means being secured to said casing, said guide means extending through said center hole provided in said movable member, and (ii) rollers retained in said movable member in a rotatable manner and engaging said spiral guide surface in a movable manner to said guide surface.

13. An impact detecting device as set forth in claim 12, wherein said elastic means comprises a coil spring which extends in the direction of the movement of said movable member, one end of said coil spring engaging said movable member in a rotatable manner.

14. An impact detecting device as set forth in claim 12, wherein said casing in tightly closed, and said movable member is housed interiorly of said casing.

15. An impact detecting device comprising:
a casing;
a movable member capable of moving substantially along a straight line relative to said casing;
means for rotating said movable member during the movement of said movable member substantially along the straight line;
elastic means interposed between said casing and said movable member for elastically loading said movable member in a direction along said straight line to resist the movement of said movable member;
a switch means to be closed, when said movable member is moved a given distance relative to said casing against the action of said elastic means,
wherein said elastic means comprises a coil spring which extends in the direction of the movement of said movable member, one end of said coil spring being secured to said movable member, the other end of said coil spring being secured to said casing, and said coil spring elastically spirally loading said movable member, which is rotating relative to said casing, in the direction to resist the rotation of said movable member.

16. An impact detecting device comprising:
a casing;
a movable member capable of moving substantially along a straight line relative to said casing;
means for rotating said movable member during the movement of said movable member substantially along the straight line;
elastic means interposed between said casing and said movable member for elastically loading said movable member in a direction along said straight line to resist the movement of said movable member;
a switch means to be closed, when said movable member is moved a given distance relative to said casing against the action of said elastic means,
wherein said means for rotating said movable member comprises (i) guide means having a cylindrical inner surface encompassing said movable member and extending in the direction of the movement of said movable member, and spiral grooves provided in said inner surface of said guide means, and (ii) interconnecting means engaging said movable member in given positions as well as said spiral grooves, and moving along said spiral grooves.

17. An impact detecting device as set forth in claim 16, wherein said interconnecting means includes recesses provided in the outer peripheral surface of said movable member, and balls which are retained in said recesses and have at least part thereof projecting from said outer peripheral surface of said movable member to engage with said grooves.

18. An impact detecting comprising:
a casing;
a movable member capable of moving between a first position and a second position substantially along a straight line relative to said casing;
means for rotating said movable member around an axis extending in the direction of movement of said movable member during the movement of said movable member substantially along the straight line;
elastic means interposed between said casing and said movable member for elastically retaining said movable member at said first position; and
switch means actuated when said movable member is moved to said second position;
wherein said movable member has a center hole extending therethrough in the direction of the movement of said movable member; and said means for rotating said movable member comprises guide means provided with spiral grooves in the outer peripheral surface thereof and having at least one end thereof secured to said casing, said guide means extending through said center hole of said movable member, and interconnecting means engaging said movable member and said spiral grooves, and being movable along said spiral grooves.

19. An impact detecting device as set forth in claim 18, wherein said interconnecting means includes recesses in the wall of said movable member in said center hole, and balls retained in said recesses and having at least part thereof projecting from said wall, said balls engaging said spiral grooves.

20. An impact detecting device as set forth in claim 18, wherein said guide means includes a rod having a plurality of said spiral grooves in its outer peripheral surface; and interconnecting means includes at least two sets of a plurality of recesses provided in the wall of said center hole in said movable member, said two sets being positioned in two planes which extend substantially at a right angle to the axis of rotation of said movable member and are spaced a distance from each other in the axial direction, and said interconnecting means including balls which are retained in said recesses and have at least parts thereof projecting from said wall of said center hole to engage with said spiral grooves.

21. An impact detecting device as set forth in claim 20, wherein said elastic means comprises a coil spring which extends in the direction of movement of said movable member, one end of said coil spring engaging said movable member in a rotatable manner.

22. An impact detecting device as set forth in claim 20, wherein said casing is tightly closed, and said movable member is housed interiorly of said casing.

23. An impact detecting device as set forth in claim 20, wherein said elastic means comprises a coil spring which extends in the direction of the movement of said movable member, one end of said coil spring being secured to said movable member, and the other end thereof being secured to said casing, thereby elastically spirally loading said movable member, which is rotating relative to said casing, in the direction to resist the rotation of said movable member.

24. An impact detecting device as set forth in claim 23, wherein said movable member comprises a hollow cylindrical member and a plurality of stacked sheet members which are contained in said hollow cylindrical member, said recesses being provided in said stacked sheet members.

25. An impact detecting device as set forth in claim 18, wherein said elastic means comprises a coil spring which extends in the direction of the movement of said movable member, one end of said coil spring engaging said movable member in a rotatable manner.

26. An impact detecting device as set forth in claim 18, wherein said casing is tightly closed and said movable member is housed interiorly of said casing.

27. An impact detecting device as set forth in claim 18, wherein said elastic means comprises a coil spring which extends in the direction of the movement of said movable member, one end of said coil spring being secured to said movable member, and the other end thereof being secured to said casing, thereby elastically spirally loading said movable member, which is rotating relative to said casing, in the direction to resist the rotation of said movable member.

28. An impact detecting device comprising:
a casing;
a movable member capable of moving between a first position and a second position substantially along a straight line relative to said casing;
means for rotating said movable member around an axis extending in the direction of movement of said movable member during the movement of said movable member substantially along the straight line;
elastic means interposed between said casing and said movable member for elastically retaining said movable member at said first position; and
switch means actuated when said movable member is moved to said second position;
wherein said movable member has a center hole extending through said movable member in the direction of the movement of said movable member; and said means for rotating said movable member includes (i) guide means which are of a substantially rectangular cross sectional shape, and have a spiral guide surface in the peripheral outer surface thereof, one end of said guide means being secured to said casing, said guide means extending through said center hole provided in said movable member, and (ii) rollers retained in said movable member in a rotatable manner and engaging said spiral guide surface in a movable manner to said guide surface.

29. An impact detecting device as set forth in claim 28, wherein said elastic means comprises a coil spring which extends in the direction of the movement of said movable member, one end of said coil spring engaging said movable member in a rotatable manner.

30. An impact detecting device as set forth in claim 28, wherein said casing is tightly closed, and said movable member is housed interiorly of said casing.

31. An impact detecting device comprising:
a casing;
a movable member capable of moving between a first position and a second position substantially along a straight line relative to said casing;
means for rotating said movable member around an axis extending in the direction of movement of said movable member during the movement of said movable member substantially along the straight line;
elastic means interposed between said casing and said movable member for elastically retaining said movable member at said first position; and
switch means actuated when said movable member is moved to said second position;
wherein said means for rotating said movable member comprises (i) guide means having a cylindrical inner surface encompassing said movable member and extending in the direction of the movement of said movable member, and spiral grooves provided in said inner surface of said guide means, and (ii) interconnecting means engaging said movable member in given positions as well as said spiral grooves, and moving along said spiral grooves.

32. An impact detecting device as set forth in claim 31, wherein said interconnecting means includes recesses provided in the outer peripheral surface of said movable member, and balls which are retained in said recesses and have at least part thereof projecting from said outer peripheral surface of said movable member to engage with said grooves.

* * * * *